US009761143B2

(12) United States Patent
Michaud et al.

(10) Patent No.: US 9,761,143 B2
(45) Date of Patent: Sep. 12, 2017

(54) PROXIMITY DETECTION SYSTEM WITH APPROACH ZONE

(71) Applicant: Strata Safety Products, LLC, Sandy Springs, GA (US)

(72) Inventors: Tom Michaud, Sandy Springs, GA (US); Michael Berube, Sandy Springs, GA (US); Brian Dunkin, Sandy Springs, GA (US); David Hakins, Sandy Springs, GA (US); Dwayne Towery, Sandy Springs, GA (US); Gary Herda, Sandy Springs, GA (US)

(73) Assignee: Strata Safety Products, LLC, Sandy Springs, GA (US)

( * ) Notice: Subject to any disclaimer, the term of this patent is extended or adjusted under 35 U.S.C. 154(b) by 39 days.

(21) Appl. No.: 14/840,412

(22) Filed: Aug. 31, 2015

(65) Prior Publication Data

US 2016/0078767 A1 Mar. 17, 2016

Related U.S. Application Data

(60) Provisional application No. 62/049,768, filed on Sep. 12, 2014.

(51) Int. Cl.
*B60Q 1/00* (2006.01)
*G08G 1/16* (2006.01)

(52) U.S. Cl.
CPC ............. *G08G 1/166* (2013.01); *G08G 1/165* (2013.01)

(58) Field of Classification Search
CPC ............. G08G 1/16; G01D 5/12; G08B 21/02
USPC ................... 340/435, 686.1, 686.6, 463, 436
See application file for complete search history.

(56) References Cited

U.S. PATENT DOCUMENTS

| | | | |
|---|---|---|---|
| 7,420,471 B2 | 9/2008 | Frederick et al. | |
| 8,169,335 B2 * | 5/2012 | Frederick | G08B 21/0213 340/573.4 |
| 8,232,888 B2 * | 7/2012 | Frederick | F16P 3/14 119/721 |
| 2009/0195360 A1 | 8/2009 | Jeon et al. | |
| 2009/0322512 A1 | 12/2009 | Frederick | |
| 2010/0271214 A1 | 10/2010 | Frederick | |
| 2011/0006912 A1 | 1/2011 | Sheardown et al. | |
| 2011/0169657 A1 | 7/2011 | August et al. | |
| 2011/0278401 A1 | 11/2011 | Sheardown et al. | |
| 2012/0059574 A1 | 3/2012 | Hada | |
| 2013/0041576 A1 | 2/2013 | Switkes et al. | |
| 2014/0139356 A1 * | 5/2014 | Vaquin | G08B 21/02 340/905 |

(Continued)

*Primary Examiner* — Phung Nguyen
(74) *Attorney, Agent, or Firm* — Blank Rome LLP

(57) ABSTRACT

Collision avoidance systems and methods. In some embodiments the collision avoidance systems may include a magnetic field generator for generating a low frequency oscillating magnetic field, and a magnetic field detector, wherein the system is configured to determine a relative speed between the magnetic field generator and the detector using magnetic speed pings generated by the magnetic field generator. In other embodiments, the methods may include generating a low frequency oscillating magnetic field from a magnetic field generator, detecting the magnetic field from a magnetic field detector, and determining a relative speed between the magnetic field generator and the detector using magnetic speed pings generated by the magnetic field generator.

22 Claims, 3 Drawing Sheets

(56) References Cited

U.S. PATENT DOCUMENTS

| | | | | |
|---|---|---|---|---|
| 2014/0191869 | A1 | 7/2014 | Frederick | |
| 2014/0266759 | A1* | 9/2014 | Pryor | E02F 3/16<br>340/686.6 |

* cited by examiner

PROXIMITY DETECTION SYSTEM WITH APPROACH ZONE

CROSS-REFERENCE TO RELATED APPLICATIONS

This Application claims the benefit of U.S. Provisional Application 62/049,768 filed on Sep. 12, 2014. This disclosure relates generally to proximity detection systems at work sites, and in particular to an interactive magnetic marker field and proximity detection system.

BACKGROUND

Many methods have been devised to warn people against being struck, pinched, crushed or otherwise harmed by vehicles and mobile equipment. Unfortunately, the systems that have been devised to help protect people and property in these industrial operations, such as proximity detection and collision avoidance systems, have usually not been very effective. A new proximity detection system was developed and successfully demonstrated for use on continuous miners, as disclosed in U.S. Pat. No. 7,420,471 (the '471 patent), U.S. Pat. No. 8,169,335 (the '335 patent) and U.S. Pat. No. 8,232,888 (the '888 patent), and US patent publications 2009/0322512 (the '512 publication), 2010/0271214 (the '214 publication) and 2013/0038320 (the '320 publication), which patents and publications are herein referred to collectively as the "Frederick patents," the disclosures of which are incorporated herein by reference in their entireties.

SUMMARY

In one aspect, the present collision avoidance system includes a magnetic field generator for generating a low frequency oscillating magnetic field; and a magnetic field detector, the system configured to determine a relative speed between the magnetic field generator and the detector using magnetic speed pings generated by the magnetic field generator. The collision avoidance system may be configured to generate at least two speed pings. In another aspect, a time between the at least two speed pings varies. And in another configuration, a time between the at least two speed pings is fixed. In one example, the time between the at least two speed pings is about 30 milliseconds (ms).

In one aspect of the collision avoidance system, a beginning of each of the at least two speed pings is generated randomly within a fixed repeating time window. In another aspect of the system, the magnetic field generator is associated with at least one of a first hazardous vehicle and a hazardous location and the magnetic field detector is associated with at least one of a second vehicle, a second location, and a person. In yet another aspect of the collision avoidance system, the magnetic field detector is configured to measure a magnitude of each of the first and second magnetic speed pings and determine the relative speed between the magnetic field generator and the detector.

In one particular configuration of the collision avoidance system, the magnetic field detector is configured to give an alarm if the determined relative speed is above a predetermined first relative speed threshold. In one aspect of the collision system, the alarm is at least one of: an RF ECHO beacon, an audio alarm, a visual alarm, and a tactile alarm, or other known alarms. In another aspect of the collision avoidance system, the magnetic field generator is configured to give an alarm if it receives an RF ECHO beacon from the magnetic field detector indicating the determined relative speed is above a predetermined first relative speed threshold.

In a another aspect of the collision avoidance system, the alarm is at least one of: an RF ECHO beacon, an audio alarm, a visual alarm, a tactile alarm, and a control signal to automatically slow, stop, or disable a machine, or other known alarms. In another aspect of the collision avoidance system, the magnetic field detector is configured to measure a magnitude of the magnetic field and transmit a response echo via radiofrequency indicative of the magnitude of the magnetic field.

In one aspect, the present method of avoiding collisions includes generating a low frequency oscillating magnetic field from a magnetic field generator, detecting the magnetic field from a magnetic field detector, and determining a relative speed between the magnetic field generator and the detector using magnetic speed pings generated by the magnetic field generator. In another aspect, the method further includes generating at least two speed pings. In one configuration, a time between the at least two speed pings varies. In another configuration a time between the at least two speed pings is fixed.

In one aspect of the method, a time between the at least two speed pings is about 30 milliseconds (ms). In another aspect, the magnetic field generator generates the at least two speed pings such that a beginning of each of the at least two speed pings is generated randomly within a fixed repeating time window. In another aspect of the method, the magnetic field generator is associated with at least one of a first hazardous vehicle and a hazardous location and the magnetic field detector is associated with at least one of a second vehicle, a second location, and a person.

In one aspect of the method, determining a relative speed between the magnetic field generator and the detector comprises the magnetic field detector measuring a magnitude of each of the first and second magnetic speed pings and determining the relative speed between the magnetic field generator and the detector. In another aspect of the method, the magnetic field detector alarms if the determined relative speed is above a predetermined first relative speed threshold. In one configuration, the alarm is at least one of: an RF ECHO beacon, an audio alarm, a visual alarm, and a tactile alarm. In another aspect of the method, the magnetic field generator alarms if it receives an RF ECHO beacon from the magnetic field detector indicating the determined relative speed is above a predetermined first relative speed threshold. In yet another aspect of the method the alarm is at least one of: an RF ECHO beacon, an audio alarm, a visual alarm, a tactile alarm, and a control signal to automatically slow, stop, or disable a machine. In another aspect of the method, determining a relative speed between the magnetic field generator and the detector includes the magnetic field detector measuring a magnitude of the magnetic field and transmitting an RF ECHO indicative of the magnitude of the magnetic field.

DETAILED DESCRIPTION

The HazardAlarm™ system 100 design includes several components physically located throughout a worksite that interoperate to provide hazard detection for hazardous conditions, i.e., to avoid collisions between objects or between objects and hazardous conditions. A hazardous condition may include a hazardous machine, for example a continuous miner or a forklift, a geographic hazard, for example an open pit, or any other obstacle. For the purposes of this description a hazardous condition will be described in terms of a machine, although it can apply to any hazardous condition. It is needed to improve collision avoidance between objects and a hazardous condition, between a hazardous condition and other hazardous conditions and between an object and other objects, to minimize false positives and improve accuracy of hazard detection. As just some examples, avoiding collisions between vehicles and workers, vehicles and vehicles, or vehicles and hazardous conditions.

Figure 1:
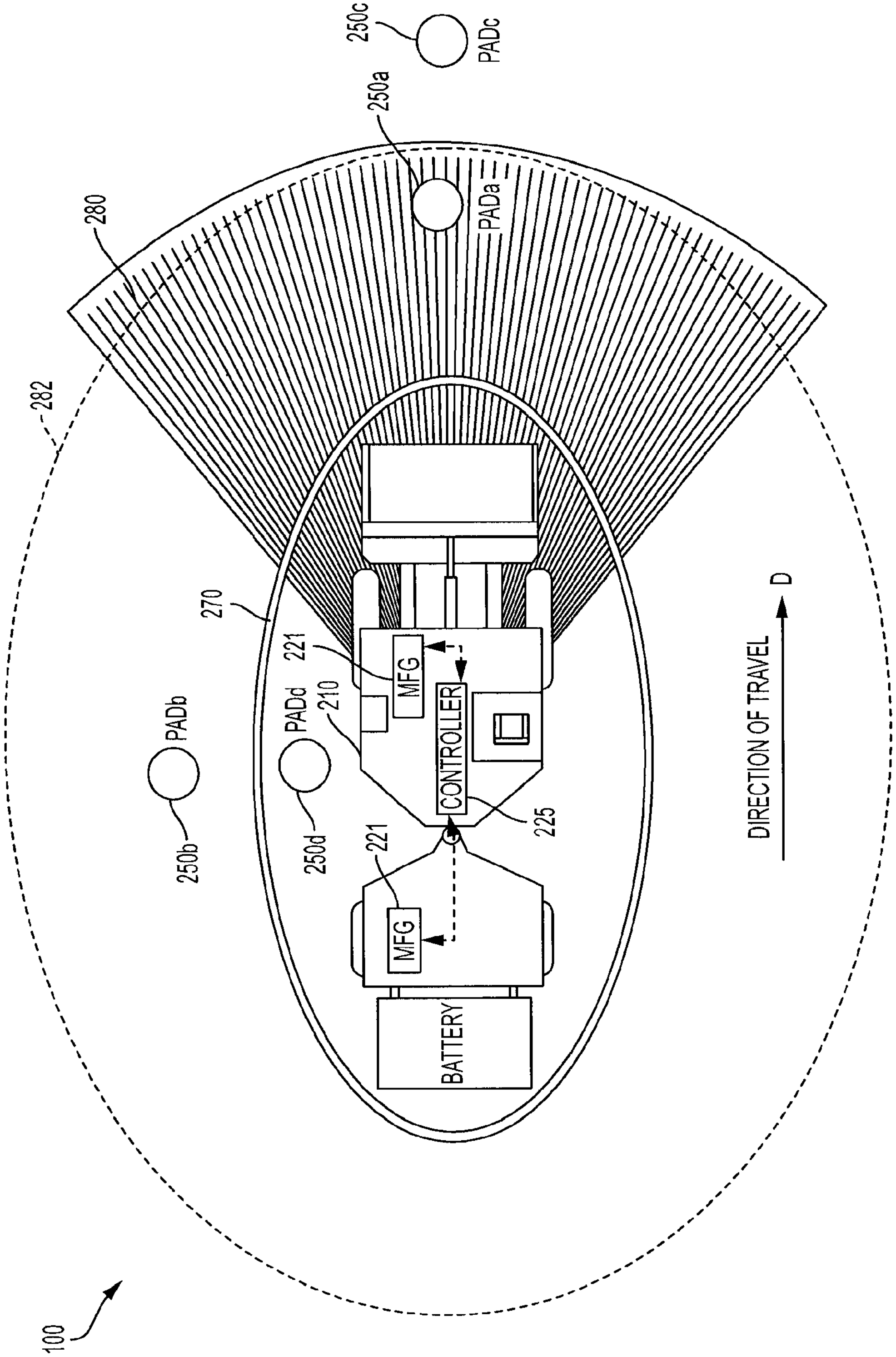
FIG. 1 is a proximity detection system, in accordance with disclosed embodiments.

With reference to FIG. 1, the illustrated HazardAlarm™ system 100 primarily includes at least one magnetic field generator 221 (MFG), which may be interconnected with an optional controller 225 located on a machine 210. Each machine can include only one MFG 221 or in some configurations more than one MFG 221. The HazardAlarm™ system also includes at least one personal alarm device 250 (PAD) or vehicle alarm device (VAD) that may be located at any location or object desired to be avoided by the machine 210 on which the MFG is located, for example on a worker (PAD), on another vehicle (VAD), or at a fixed location. A single controller 225 can control multiple MFGs 221 on the same machine 210 and there can be multiple machines 210 each having MFGs in the same work site. Similarly, there can be multiple PADs (e.g., PADs 250*a* and 250*b*) in the same work area and communicating with several MFGs.

The HazardAlarm™ system can be configured to improve collision avoidance by detecting the relative speed between an MFG and a PAD. This is generally accomplished by measuring the magnetic field strength generated by a MFG at two times by a PAD and determining the rate of change of the magnetic field strength. The magnetic field strength is indicative of the distance between the PAD and the MFG in a way and manner generally understood to a person of ordinarily skill. Thus by measuring the change in magnetic field strength over a change in time, the relative speed of the MFG and PAD can be determined. More specifics will be discussed below.

In one configuration the HazardAlarm™ 100 system can be configured to emit a set of speed PINGs comprising at least two magnetic pulse speed PINGs from a MFG. As long as the timing of the speed PINGs is known, the change in time can be established at the PAD. A set of two speed PINGs, will be referred to herein as a double speed PING. It should be noted, that a double speed PING is just one example. The set of speed PINGs may consist of any number of PINGs greater than or equal to two. Furthermore, the time between the pings may be fixed or vary so long as the timing between the speed PINGs is known or can be determined. In one configuration, a single MFG (or in some configurations with multiple MFG's, a single controller controlling multiple MFGs) generates and transmits the speed PINGs with a pre-determined speed PING time separation $\Delta t$. This $\Delta t$ configuration has the advantage of being able to reject spurious noise PINGs, possibly from other MFGs, in order to ignore them for the purposes of relative speed determination. The $\Delta t$ can be set to any value suitable for local conditions. In one example, $\Delta t$ is about 30 ms (+/−0.1 ms).

The HazardAlarm™ 100 system can be configured to operate the speed PINGs within a fixed PING window, for example in accordance with a random algorithm for PING selection, i.e., within repeating time windows, for example as discussed in the Frederick patents. The time window repeats multiple times per second. If the HazardAlarm™ system is configured with a fixed PING window then the controller can be configured to send the first pulse such that beginning of the last pulse of the speed PINGs occur within the PING window. In one example, using a double speed PING and a fixed PING window of 150 milliseconds (ms), a pre-determined speed PING time separation $\Delta t$ of 30 ms, and a PING duration of 3 ms, the controller is configured to send the first pulse no later than 117 ms into the PING window (subtracting the PING duration and $\Delta t$ from the PING window).

Figure 2:
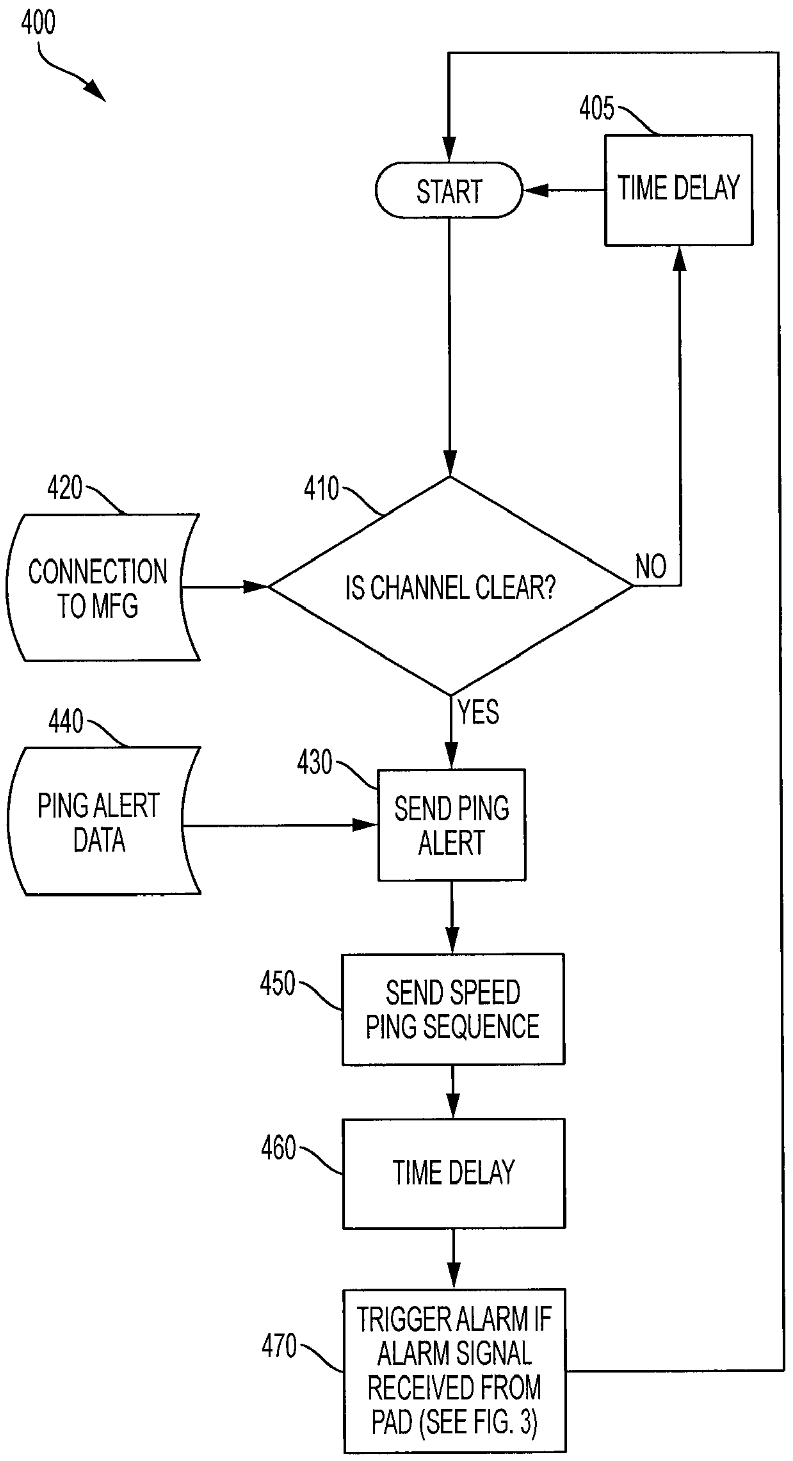
FIG. 2 is a proximity detection method, in accordance with disclosed embodiments.

In one example configured to use a double speed PING, the controller follows the method 400 outlined in FIG. 2. In configurations not including a controller, the method 400 may be performed in software executing on the MFG 221. At step 410, the controller may connect at step 420 to a MFG and listen for incoming PING pulses received from other machines to ensure the channel is clear, including other RF PING alerts (discussed below) or magnetic field PING pulses. If the channel is not clear, the controller waits for a pre-determined delay 405 and then restarts the process. If the channel is clear, the controller may be configured to trigger a radiofrequency (RF) PING alert at step 430 containing information related to the local machine 210 (FIG. 1). However this step is not required.

The RF PING alert is transmitted using RF as opposed to the magnetic field pulses of the speed PINGS and may be transmitted at a fixed time period with respect to the speed PINGs sent at step 450 (discussed below). For example, the RF PING alert can be transmitted about 1 ms before sending the first speed PING. The MFG 221 may use a combination of carrier sense detect (CSD, a method of determining if other transmitters are transmitting) and record of recent history to determine RF channel contention. The RF PING alert packet may contain information about the local machine, proximity hardware and local channel. This information may be utilized by the PAD 250 to associate the data with the subsequent PING. Some examples of information the RF PING alert packet may contain include: machine id; generator id (# on the machine); proximity algorithm version (HazardAlarm™, HazardAvert™, shaped field); proximity system type (# generators, generator location); location in latitude/longitude; speed; time; machine type; hazard zone threshold; warning zone threshold; alarm closing speed threshold; and congestions control flag. In one configuration, all HazardAlarm™ systems within a work site may be configured to utilize the same RF frequency band for all communication between PAD, VAD and Generators.

The RF PING alert data 440 can be obtained from a plurality of sources including controller software or firmware, as well as interfaces to other systems. For example, the controller may interface with the machine via an interface, for example a controller area network (CAN) such as a J1939 CAN bus, when available and receive speed, time, location and event data. The controller may utilize GPS data coming from the MFG 221 for speed, time and location estimation. The controller may also be configured with an embedded calendar chip with battery backup for time and an inertial momentum unit (IMU) or inertial navigation system (INS) for acceleration events. Additional information related to the RF PING alert may be found in the Frederick patents.

At step 450, the controller triggers the sending of the double speed PING with the speed PING time separation $\Delta t$ between speed PING pulses. A time delay occurs at step 460 to ensure the controller and MFGs are listening for ECHO responses from PADs at the correct ECHO response window. At step 470, if a PAD ECHO response includes a signal to trigger an alarm, the controller triggers an appropriate alarm to take place. For example, the HazardAlarm™ system can be configured to give different alarms, such as different audio, visual, or tactile alarms for different relative speeds between the machine 210 and PAD to the operator of the machine 210. In another configuration, the machine (or part of the machine) can be automatically slowed, stopped, or disabled.

Figure 3:
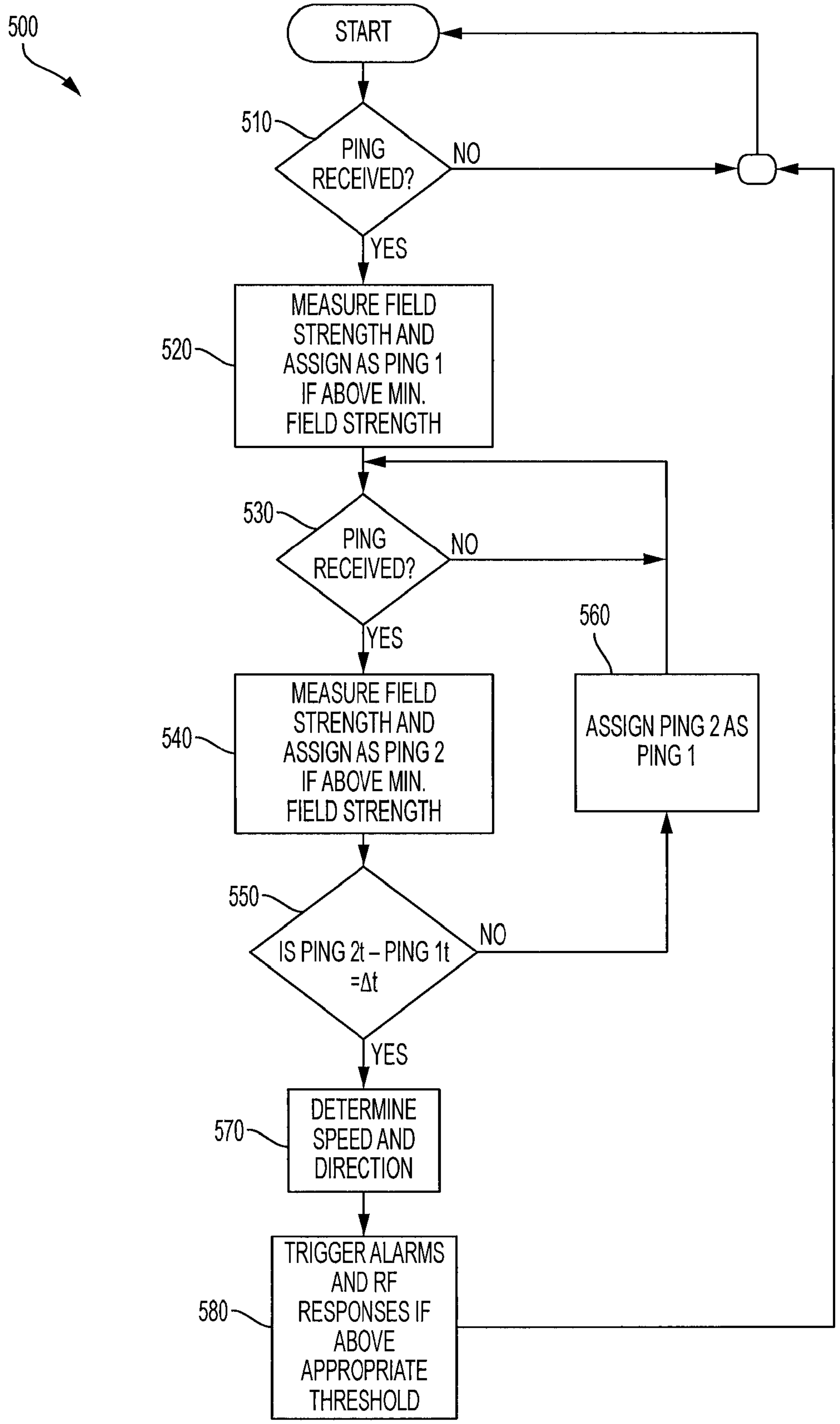
FIG. 3 is a proximity detection method, in accordance with disclosed embodiments.

In one example, the PAD is configured to follow the method 500 outlined in FIG. 3. At step 510, the PAD listens and determines if a PING has been received. If it has not, it continues to listen. If a PING is received, at step 520 the PAD measures the field strength and records the magnitude of the field strength (or a number indicative of field strength) as a variable, for example PING1 if it is above a predetermined minimum field strength. The predetermined minimum field strength will be discussed further below. Other information associated with PING1 is also recorded, for example the time of the measurement and magnitude of the PING1 strength.

At step 530, the PAD continues to listen and determines if a PING has been received. If it has not, it continues to listen. Time delays may be instituted in listening steps to assist with process flow or power management. If a PING is received, at step 540 the PAD measures the field strength (or a number indicative of field strength) and records the field strength as a variable, for example PING2 (along with other associated data) if it is above the predetermined minimum field strength. At step 550 a determination is made if the difference in time between PING1 and PING2 is equal to Δt. If it is not, then at step 560 the values associated with PING2 are re-written over the values of PING1. Steps 530, 540 and 550 are repeated until two pings separated in time by Δt are received or the end of a listening window is reached. At step 570, the PAD determines the relative speed (both magnitude and direction, i.e. speed and either moving closer or moving apart) between the machine and the PAD. At step 580 if the determined relative speed is above an alarm threshold, then an appropriate alarm may be triggered. For example, the threshold may be between about 2 mph to about 5 mph of closing speed. However, any speed may be set in accordance with the worksite safety plan. An alarm may consist of an RF ECHO beacon configured to be received by the MFG on the machine or a local alarm. For example, the PAD can be configured to give different alarms, such as different audio, visual, or tactile alarms for different relative speeds between the machine and PAD or for being in hazard zone 270 (discussed below). The alarms can be intermittent, for example blinking, or continuous, or any other configuration.

In another configuration, the controller 225 or MFG 221 performs some or all of the determination steps discussed in method 500. For example, each time a PING is received by PAD, PAD may be configured to send a response ECHO indicative of the magnetic field strength. Then the controller 225 (or MFG 221) stores the magnetic field strength information, determines whether the ECHO responses are properly timed, and determines the relative speed and alarm actions. Similarly, any step of the speed and/or alarm method may be distributed throughout any of the HazardAlarm™ 100 system components. For example, any steps described above with reference to a single MFG may similarly be performed by multiple MFG communicating to a controller. This configuration, may allow HazardAlarm™ 100 to better translate PINGs into PAD positions and allow different pieces of equipment to provide for different warning levels in the same environment.

FIG. 1 shows the direction of travel D of machine 210 with respect to four PADs 250: 250*a*; 250*b*; 250*c*; and 250*d*. Those PADs 250 shown are examples only, and represent one possible configuration. A plurality of PADs 250 is not required. Even though PADa 250*a* is further away from machine 210 than PADb 250*b*, because the direction of travel D of machine 210 is directly towards PADa 250*a*, PADa 250*a* will detect a higher relative speed as compared to PADb and may trigger an alarm if above the threshold limit. PADc 250*c* is located in the same path of machine 210 as PADa 250*a*. However, PADc is located outside dashed line 282. The dashed line 282 represents an approach zone and is the location at which field strength is at a threshold magnetic field strength of speed determination. That is, if a PAD 250 determines that it is outside the approach zone (dashed line 282) because it detects that the magnetic field strength is below the threshold magnetic field strength of speed determination, the PAD 250 will not determine the relative speed of the machine 210 and PAD 250 using that ping pulse. However, in the example shown in FIG. 1, with time (as machine 210 gets closer to PADc 250*c*), PADc 250*c* will eventually be inside of the approach zone 280 and make a relative speed determination.

The approach zone represents the set point zone in which the PADs 250 are configured to calculate and alarm based on relative speed. The shape of the approach zone can be constricted or altered using an angled MFG 221, or using multiple MFGs 221 including the use of additive or subtractive zones as described in the Frederick patents. For example, approach zone 280 is shown with a 75 degree field of view. However, the approach zone(s) can be any shape, including 360 degrees, as shown for example as approach zone 282.

In one configuration the HazardAlarm™ system 100 also includes a hazard zone 270, such that a PAD 250, for example PADd 250*d*, is configured to alarm regardless of relative speed if it determines that it is within the hazard zone 270. In one configuration, if a PAD 250 detects that it is in the hazard zone on the first ping, immediate action is taken to trigger the required alarm actions without waiting for the second speed ping.

The PAD may further include a position location system, for example GPS for location, time and speed information. The PAD may utilize this information to determine if it is located in a hazard zone and/or approach zone 280.

The MFG may also include a position determination system. When position determination is available from the position determination system, the controller can be configured to utilize speed, location and direction of travel from the position determination system in order to assist in potential collisions detection and traffic awareness. For example, when position determination is available, the controller can use geolocation zones in order to enable/disable certain functions of the MFGs.

The above description and drawings are only illustrative of preferred embodiments, and are not intended to be limiting. Any subject matter or modification thereof which comes within the spirit and scope of the following claims is to be considered part of the present inventions.

What is claimed as new and desired to be protected by Letters Patent in the United States is:

1. A collision avoidance system comprising:

a magnetic field generator for generating a low frequency oscillating magnetic field; and a magnetic field detector, wherein the system is configured to determine a relative speed between the magnetic field generator and the detector using magnetic speed pings generated by the magnetic field generator; and wherein the system is configured to generate at least two speed pings and the magnetic field detector is configured to measure a magnitude of each of the first and second magnetic speed pings and determine the relative speed between the magnetic field generator and the detector.

2. The collision avoidance system of claim 1, wherein a time between the at least two speed pings varies.

3. The collision avoidance system of claim 1, wherein a time between the at least two speed pings is fixed.

4. The collision avoidance system of claim 3, wherein the time between the at least two speed pings is about 30 milliseconds (ms).

5. The collision avoidance system of claim 1, wherein a beginning of each of the at least two speed pings is generated randomly within a fixed time window, the fixed time window being configured to repeat.

6. The collision avoidance system of claim 1, wherein the magnetic field generator is associated with at least one of a first hazardous vehicle and a hazardous location and the magnetic field detector is associated with at least one of a second vehicle, a second location, and a person.

7. The collision avoidance system of claim 1, wherein the magnetic field detector is configured to give an alarm if the determined relative speed is above a predetermined first relative speed threshold.

8. The collision avoidance system of claim 7, wherein the alarm is at least one of: an RF ECHO beacon, an audio alarm, a visual alarm, and a tactile alarm.

9. The collision avoidance system of claim 8, wherein the magnetic field generator is configured to give an alarm if it receives an RF ECHO beacon from the magnetic field detector indicating the determined relative speed is above a predetermined first relative speed threshold.

10. The collision avoidance system of claim 9, wherein the alarm is at least one of: an RF ECHO beacon, an audio alarm, a visual alarm, a tactile alarm, and a control signal to automatically slow, stop, or disable a machine.

11. The collision avoidance system of claim 1, wherein the magnetic field detector is configured to measure a magnitude of the magnetic field and transmit a response echo via radiofrequency indicative of the magnitude of the magnetic field.

12. A method of avoiding collisions comprising:

generating a low frequency oscillating magnetic field from a magnetic field generator;

detecting the magnetic field from a magnetic field detector;

generating at least two magnetic speed pings by the magnetic field generator; and determining a relative speed between the magnetic field generator and the detector using the speed pings, wherein determining a relative speed between the magnetic field generator and the detector comprises the magnetic field detector measuring a magnitude of each of the first and second magnetic speed pings and determining the relative speed between the magnetic field generator and the detector.

13. The method of avoiding collisions of claim 12, wherein a time between the at least two speed pings varies.

14. The method of avoiding collisions of claim 12, wherein a time between the at least two speed pings is fixed.

15. The method of avoiding collisions of claim 12, wherein a time between the at least two speed pings is about 30 milliseconds (ms).

16. The method of avoiding collisions of claim 12, the magnetic field generator generates the at least two speed pings such that a beginning of each of the at least two speed pings is generated randomly within a fixed time window, the fixed time window repeating.

17. The method of avoiding collisions of claim 12, wherein the magnetic field generator is associated with at least one of a first hazardous vehicle and a hazardous location and the magnetic field detector is associated with at least one of a second vehicle, a second location, and a person.

18. The method of avoiding collisions of claim 12, further comprising the magnetic field detector alarming if the determined relative speed is above a predetermined first relative speed threshold.

19. The method of avoiding collisions of claim 18, wherein the alarm is at least one of: an RF ECHO beacon, an audio alarm, a visual alarm, and a tactile alarm.

20. The method of avoiding collisions of claim 19, further comprising the magnetic field generator alarming if it receives an RF ECHO beacon from the magnetic field detector indicating the determined relative speed is above a predetermined first relative speed threshold.

21. The method of avoiding collisions of claim 20, wherein the alarm is at least one of: an RF ECHO beacon, an audio alarm, a visual alarm, a tactile alarm, and a control signal to automatically slow, stop, or disable a machine.

22. The method of avoiding collisions of claim 12, wherein determining a relative speed between the magnetic field generator and the detector comprises the magnetic field detector measuring a magnitude of the magnetic field and transmitting an RF ECHO indicative of the magnitude of the magnetic field.

* * * * *